United States Patent
Tanaka et al.

(10) Patent No.: US 10,622,927 B2
(45) Date of Patent: Apr. 14, 2020

(54) PARAMETER SELECTION SUPPORT SYSTEM, PARAMETER SELECTION SUPPORT METHOD, AND PARAMETER SELECTION SUPPORT PROGRAM

(71) Applicant: Mitsubishi Electric Corporation, Tokyo (JP)

(72) Inventors: Shinji Tanaka, Tokyo (JP); Yasuyuki Saito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/330,101

(22) PCT Filed: Aug. 30, 2017

(86) PCT No.: PCT/JP2017/031186
§ 371 (c)(1),
(2) Date: Mar. 4, 2019

(87) PCT Pub. No.: WO2019/043836
PCT Pub. Date: Mar. 7, 2019

(65) Prior Publication Data
US 2019/0379313 A1  Dec. 12, 2019

(51) Int. Cl.
*H02P 5/00* (2016.01)
*H02P 23/00* (2016.01)
*G06F 3/0484* (2013.01)

(52) U.S. Cl.
CPC ...... *H02P 23/0027* (2013.01); *G06F 3/04842* (2013.01); *G06F 3/04847* (2013.01)

(58) Field of Classification Search
CPC . G05B 23/02; G06F 3/04842; G06F 3/04847; H02P 23/0027; H02P 29/00
(Continued)

(56) References Cited

U.S. PATENT DOCUMENTS

2010/0228697 A1  9/2010  Komiya et al.
2013/0317633 A1  11/2013  Matsumura et al.
(Continued)

FOREIGN PATENT DOCUMENTS

| CN | 103612153 A | 3/2014 |
|---|---|---|
| JP | 2006-042589 A | 2/2006 |

(Continued)

OTHER PUBLICATIONS

International Search Report dated Nov. 14, 2017 for PCT/JP2017/031186 filed on Aug. 30, 2017, 2 pages (Japanese Copy Only).
(Continued)

*Primary Examiner* — Bickey Dhakal
*Assistant Examiner* — Gabriel Agared
(74) *Attorney, Agent, or Firm* — Xsensus LLP

(57) ABSTRACT

A parameter selection support system that supports, based on a capacity of a drive device, selection of parameters of an operation pattern and parameters of mechanical condition for a load that is driven by the drive device and includes a display unit that displays an input screen for the parameters, a reception unit that receives the parameters and the capacity, and a controller that calculates an allowable range for each of some of the parameters that is allowable for the capacity received by the reception unit and causes the display unit to display the allowable range on the input screen. The parameters of the operation pattern include a moving amount of the load.

8 Claims, 12 Drawing Sheets

(58) Field of Classification Search
USPC .......................................................... 318/255
See application file for complete search history.

(56) References Cited

U.S. PATENT DOCUMENTS

| 2014/0200727 | A1* | 7/2014 | Takahashi | H02J 4/00 |
| | | | | 700/295 |
| 2015/0377970 | A1* | 12/2015 | Takei | B60W 10/08 |
| | | | | 318/490 |
| 2017/0139391 | A1* | 5/2017 | Yamamoto | G05B 19/0428 |
| 2019/0361467 | A1* | 11/2019 | Fujita | G05D 3/20 |
| 2019/0386595 | A1* | 12/2019 | Fujita | G06F 17/16 |

FOREIGN PATENT DOCUMENTS

| JP | 2010-193687 A | 9/2010 |
| JP | 2015-084155 A | 4/2015 |
| WO | 2009/075152 A1 | 6/2009 |
| WO | 2013/145296 A1 | 10/2013 |
| WO | 2016/185590 A1 | 11/2016 |

OTHER PUBLICATIONS

Notice of Rejection received for Japanese Patent Application No. 2018-516089, dated Apr. 24, 2018, 8 pages including English Translation.

Notice of Rejection received for Japanese Patent Application No. 2018-516089, dated Jul. 10, 2018, 7 pages including English Translation.

Decision to Grant a Patent received for Japanese Patent Application No. 2018-516089, dated Sep. 11, 2018, 4 pages including English Translation.

* cited by examiner

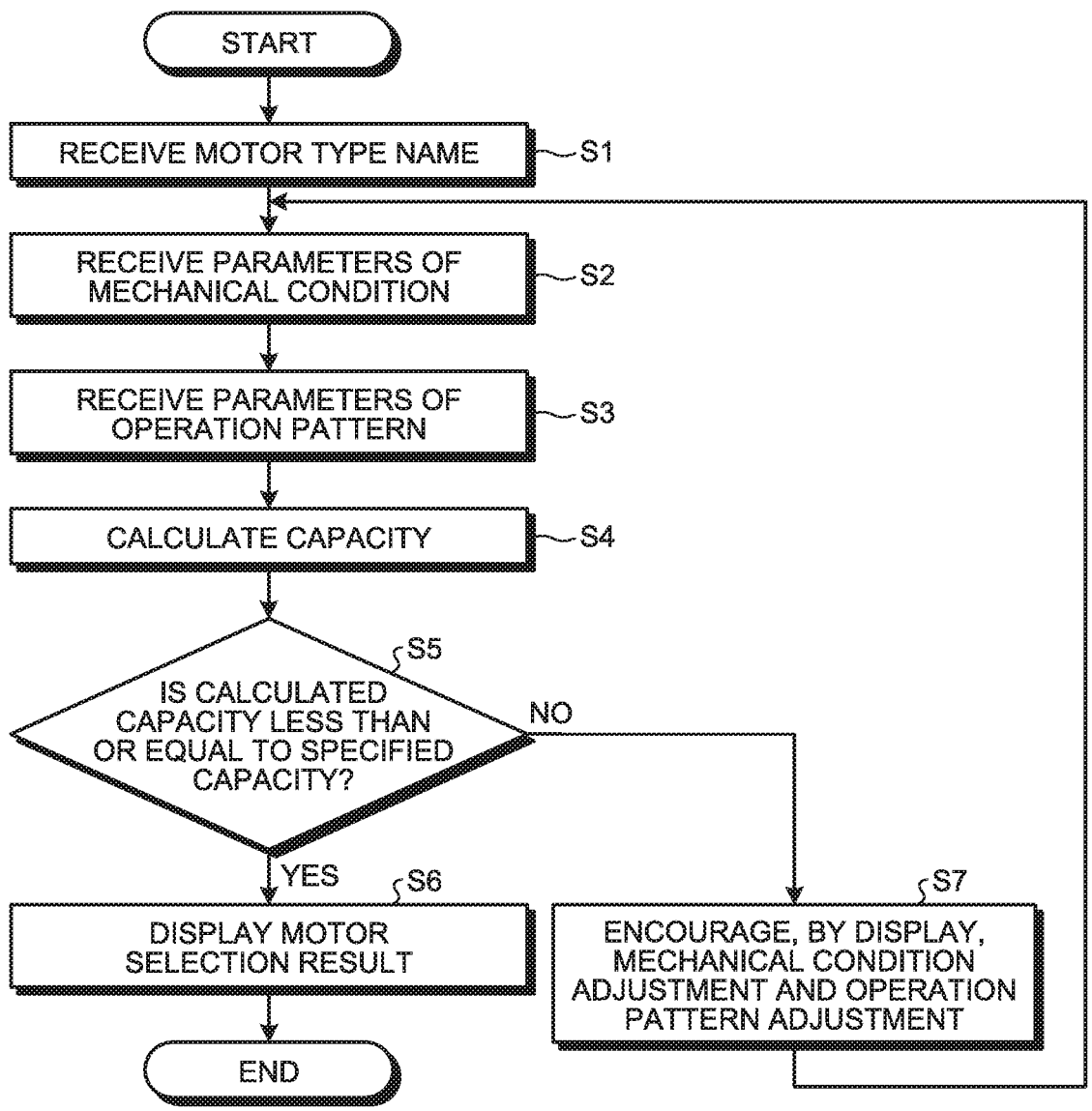

FIG.4

| MOTOR TYPE NAME | MAXIMUM ROTATIONAL SPEED | MAXIMUM TORQUE | RATED TORQUE | RATED OUTPUT |
|---|---|---|---|---|
| motor-A | 6000 [rev/min] | 4.5 [N·m] | 1.5 [N·m] | 400 [W] |

FIG.5

LOAD MECHANISM SETTING

| | | |
|---|---|---|
| TABLE MASS | 200 | kg |
| LOAD MASS | 0 | kg |
| LOAD REACTION FORCE | 300 | N |
| CLAMPING FORCE OF TABLE GUIDE FACE | 0 | N |
| ANOTHER OUTPUT SHAFT CONVERTED INERTIA | 0 | kg-cm$^2$ |
| BALL SCREW LEAD | 10 | mm |
| BALL SCREW DIAMETER | 20 | mm |
| BALL SCREW LENGTH | 500 | mm |
| DRIVE UNIT EFFICIENCY | 0.9 | |
| FRICTION COEFFICIENT | 0.1 | |

| OPERATION PATTERN SETTING | | |
|---|---|---|
| MOVING AMOUNT | 200 | mm |
| SPEED | 200 | mm/s |
| ACCELERATION TIME | 0.15 | s |
| CONSTANT-SPEED TIME | 0.8 | s |
| DECELERATION TIME | 0.15 | s |
| IDLE TIME | 0.2 | s |

FIG.8

SELECTION RESULT

| ROTATIONAL SPEED | TORQUE DURING ACCELERATION | TORQUE DURING DECELERATION | CONTINUOUSLY EFFECTIVE LOAD TORQUE | OUTPUT WATTAGE |
|---|---|---|---|---|
| 4000 [rev/min] | 3.5 [N·m] | -1.0 [N·m] | 1.0 [N·m] | 250 [W] |

FIG.9

LOAD MECHANISM SETTING

| | | |
|---|---|---|
| TABLE MASS | 200 | kg ≤150 |
| LOAD MASS | 0 | kg |
| LOAD REACTION FORCE | 300 | N |
| CLAMPING FORCE OF TABLE GUIDE FACE | 0 | N |
| ANOTHER OUTPUT SHAFT CONVERTED INERTIA | 0 | kg-cm$^2$ |
| BALL SCREW LEAD | 10 | mm |
| BALL SCREW DIAMETER | 20 | mm ≤15 |
| BALL SCREW LENGTH | 500 | mm |
| DRIVE UNIT EFFICIENCY | 0.9 | |
| FRICTION COEFFICIENT | 0.1 | |

FIG.10

OPERATION PATTERN SETTING

| MOVING AMOUNT | 200 ≤ | 200 | ≤ | 200 | mm |
| --- | --- | --- | --- | --- | --- |
| SPEED | 100 ≤ | 200 | ≤ | 200 | mm/s |
| ACCELERATION TIME | 0.3 ≤ | 0.15 | ≤ | 0.5 | s |
| CONSTANT-SPEED TIME | 0.6 ≤ | 0.8 | ≤ | 0.8 | s |
| DECELERATION TIME | 0.13 ≤ | 0.15 | ≤ | 0.15 | s |
| IDLE TIME | 0.2 ≤ | 0.2 | ≤ | 0.2 | s |

FIG.11

LOAD MECHANISM SETTING

FIX
| | | |
| --- | --- | --- |
| ☐ TABLE MASS | 200 | kg |
| ☐ LOAD MASS | 0 | kg |
| ☐ LOAD REACTION FORCE | 300 | N |
| ☐ CLAMPING FORCE OF TABLE GUIDE FACE | 0 | N |
| ☐ ANOTHER OUTPUT SHAFT CONVERTED INERTIA | 0 | kg-cm$^2$ |
| ☐ BALL SCREW LEAD | 10 | mm |
| ☑ BALL SCREW DIAMETER | 20 | mm |
| ☐ BALL SCREW LENGTH | 500 | mm |
| ☐ DRIVE UNIT EFFICIENCY | 0.9 | |
| ☐ FRICTION COEFFICIENT | 0.1 | |

FIG.12

LOAD MECHANISM SETTING

| | | |
|---|---|---|
| TABLE MASS | 200 | kg ≤150 |
| LOAD MASS | 0 | kg |
| LOAD REACTION FORCE | 300 | N |
| CLAMPING FORCE OF TABLE GUIDE FACE | 0 | N |
| ANOTHER OUTPUT SHAFT CONVERTED INERTIA | 0 | kg-cm² |
| BALL SCREW LEAD | 10 | mm |
| BALL SCREW DIAMETER | 20 | mm |
| BALL SCREW LENGTH | 500 | mm |
| DRIVE UNIT EFFICIENCY | 0.9 | |
| FRICTION COEFFICIENT | 0.1 | |

FIG.13

OPERATION PATTERN SETTING

| | | | | | |
|---|---|---|---|---|---|
| MOVING AMOUNT | 200 ≤ | 200 | ≤ | 200 | mm |
| SPEED | 100 ≤ | 200 | ≤ | 200 | mm/s |
| ACCELERATION TIME | 0.3 ≤ | 0.15 | ≤ | 0.5 | s |
| CONSTANT-SPEED TIME | 0.6 ≤ | 0.8 | ≤ | 0.8 | s |
| DECELERATION TIME | 0.13 ≤ | 0.15 | ≤ | 0.15 | s |
| IDLE TIME | 0.2 ≤ | 0.2 | ≤ | 0.2 | s |

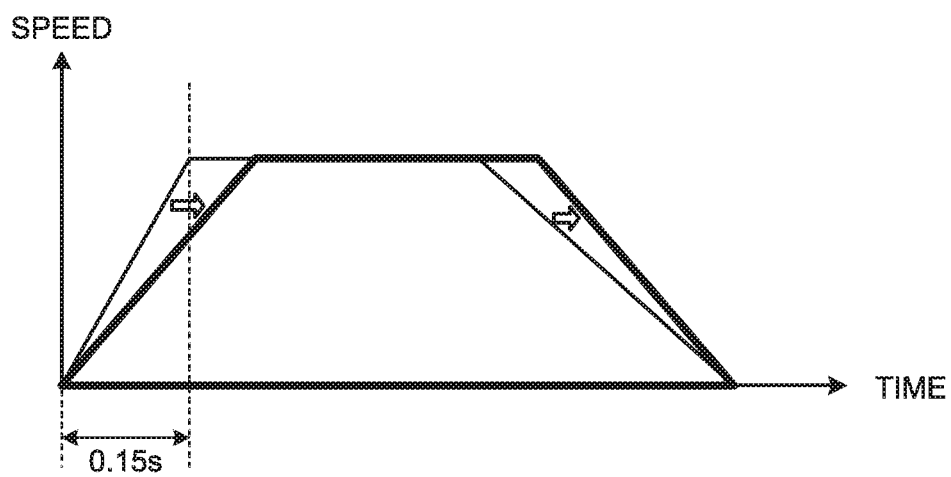

| OPERATION PATTERN SETTING | | | | | FIX |
|---|---|---|---|---|---|
| MOVING AMOUNT | | | 200 | | ⌄ |
| SPEED | 100 | ≤ | 200 | ≤ 200 mm/s | |
| ACCELERATION TIME | 0.3 | ≤ | 0.15 | ≤ 0.5 s | |
| CONSTANT-SPEED TIME | 0.6 | ≤ | 0.8 | ≤ 0.8 s | |
| DECELERATION TIME | 0.13 | ≤ | 0.15 | ≤ 0.15 s | |
| IDLE TIME | | | 0.2 | | ⌄ |

| OPERATION PATTERN SETTING | | | FIXATION DEGREE |
|---|---|---|---|
| MOVING AMOUNT | 200 | mm | 80% |
| SPEED | 200 | mm/s | 0% |
| ACCELERATION TIME | 0.15 | s | 20% |
| CONSTANT-SPEED TIME | 0.8 | s | 0% |
| DECELERATION TIME | 0.15 | s | 20% |
| IDLE TIME | 0.2 | s | 100% |

FIG.20

| OPERATION PATTERN SETTING | | | | | | | FIXATION DEGREE |
|---|---|---|---|---|---|---|---|
| MOVING AMOUNT | 190 | ≤ | 200 | ≤ | 200 | mm | 80% |
| SPEED | 100 | ≤ | 200 | ≤ | 200 | mm/s | 0% |
| ACCELERATION TIME | 0.15 | ≤ | 0.27 | ≤ | 0.27 | s | 20% |
| CONSTANT-SPEED TIME | 0.6 | ≤ | 0.8 | ≤ | 0.8 | s | 0% |
| DECELERATION TIME | 0.134 | ≤ | 0.15 | ≤ | 0.15 | s | 20% |
| IDLE TIME | 0.2 | ≤ | 0.2 | ≤ | 0.2 | s | 100% |

FIG.21

| FIXATION DEGREE | 100% | 90% | 80% | 70% | 60% | 50% | 40% | 30% | 20% | 10% | 0% |
|---|---|---|---|---|---|---|---|---|---|---|---|
| MOVING AMOUNT | 200 | 195 | 190 | 185 | 180 | 175 | 170 | 165 | 160 | 155 | 150 |
| SPEED | 200 | 190 | 180 | 170 | 160 | 150 | 140 | 130 | 120 | 110 | 100 |
| ACCELERATION TIME | 0.15 | 0.165 | 0.18 | 0.195 | 0.21 | 0.225 | 0.24 | 0.255 | 0.27 | 0.285 | 0.3 |
| CONSTANT-SPEED TIME | 0.8 | 0.78 | 0.76 | 0.74 | 0.72 | 0.7 | 0.68 | 0.66 | 0.64 | 0.62 | 0.6 |
| DECELERATION TIME | 0.15 | 0.178 | 0.146 | 0.144 | 0.142 | 0.14 | 0.138 | 0.136 | 0.134 | 0.132 | 0.13 |

PARAMETER SELECTION SUPPORT SYSTEM, PARAMETER SELECTION SUPPORT METHOD, AND PARAMETER SELECTION SUPPORT PROGRAM

CROSS-REFERENCE TO RELATED APPLICATION

The present application is based on PCT filing PCT/JP2017/031186, filed Aug. 30, 2017, which is incorporated herein by reference.

FIELD

The present invention relates to a parameter selection support system that is a capacity selection tool which selects a capacity of a drive device such as a servomotor based on parameters of an operation pattern and parameters of mechanical condition. The present invention also relates to a parameter selection support method and a parameter selection support program.

BACKGROUND

A conventional capacity selection tool is intended to determine a motor capacity, that is to say, a capacity of a drive device that drives a load based on parameters of an operation pattern and parameters of mechanical condition for the load and to select a motor having that capacity. The capacity here implies an output of the drive device, namely, a wattage of the motor.

Some users, however, demand preselection of a motor and a capacity based on a constraint such as a budget, and later review for allowable parameters of an operation pattern and allowable parameters of mechanical condition for a load with respect to the selected capacity. In that case, the users need to repeat an operation involving entering parameters of an operation pattern and parameters of mechanical condition into the capacity selection tool to make the capacity selection tool calculate a required capacity and select a drive device having the capacity, and this is time-consuming.

On the other hand, in a device that is disclosed in Patent Literature 1 and selects a motor control unit, use conditions corresponding to the above-described parameters are specified, and an intended motor and an intended controller are predetermined. This device judges whether or not the predetermined motor and the predetermined controller can be used. A use condition sensitivity display unit displays use condition tendencies that enable use of the predetermined motor and the predetermined controller within their capabilities.

CITATION LIST

Patent Literature

Patent Literature 1: Japanese Patent Application Laid-open No. 2010-193687

SUMMARY

Technical Problem

A command setting unit disclosed in Patent Literature 1 shows magnitude of a capacity based on an acceleration time, a deceleration time, and a maximum speed to encourage re-input. However, with the command setting unit disclosed in Patent Literature 1, a change cannot be made to a time for which a constant speed is maintained, and a moving amount cannot be taken into consideration. This problematically affects positioning operation of the unit.

The present invention has been made in view of the above, and an object of the present invention is to obtain a parameter selection support system capable of providing a support for a user to easily set parameters including a moving amount in relation to a capacity of a specified drive device.

Solution to Problem

An aspect of the present invention provides a parameter selection support system that supports, based on a capacity of a drive device, selection of parameters of an operation pattern and parameters of mechanical condition for a load that is driven by the drive device. The parameter selection support system includes: a display unit to display an input screen for the parameters; a reception unit to receive the parameters and the capacity; and a controller to calculate an allowable range for each of some of the parameters that is allowable for the capacity received by the reception unit and to cause the display unit to display the allowable range on the input screen, wherein the parameters of the operation pattern include a moving amount of the load.

Advantageous Effect of Invention

The parameter selection support system according to the present invention is capable of support that makes it easy for a user to set the parameters including the moving amount in relation to the capacity of the specified drive device.

BRIEF DESCRIPTION OF DRAWINGS

FIG. 3 is a flowchart showing operation of the parameter selection support system according to the first embodiment.

FIG. 4 illustrates a motor input screen according to the first embodiment.

FIG. 5 illustrates a mechanical condition input screen according to the first embodiment.

FIG. 8 illustrates a screen showing a motor selection result according to the first embodiment.

FIG. 9 illustrates a mechanical condition input screen where parameters are shown with allowable ranges according to the first embodiment.

FIG. 10 illustrates an operation pattern input screen where parameters are shown with allowable ranges according to the first embodiment.

FIG. 11 illustrates another mechanical condition input screen according to the first embodiment.

FIG. 12 illustrates another mechanical condition input screen where the parameters are shown with allowable ranges according to the first embodiment.

FIG. 13 illustrates an operation pattern input screen where parameters are shown with respective allowable ranges according to a second embodiment of the present invention.

FIG. 14 illustrates how an operation pattern is corrected according to the second embodiment.

FIG. 15 illustrates an operation pattern input screen according to a third embodiment of the present invention.

FIG. 20 illustrates an operation pattern input screen where parameters are shown with respective allowable ranges according to the fourth embodiment.

FIG. 21 illustrates a relationship between fixation degree and each of the allowable ranges according to the fourth embodiment.

DESCRIPTION OF EMBODIMENTS

With reference to the drawings, a detailed description is hereinafter provided of parameter selection support systems, parameter selection support methods, and a parameter selection support program according to embodiments of the present invention. It is to be noted that these embodiments are not restrictive of the present invention.

First Embodiment

Figure 1:
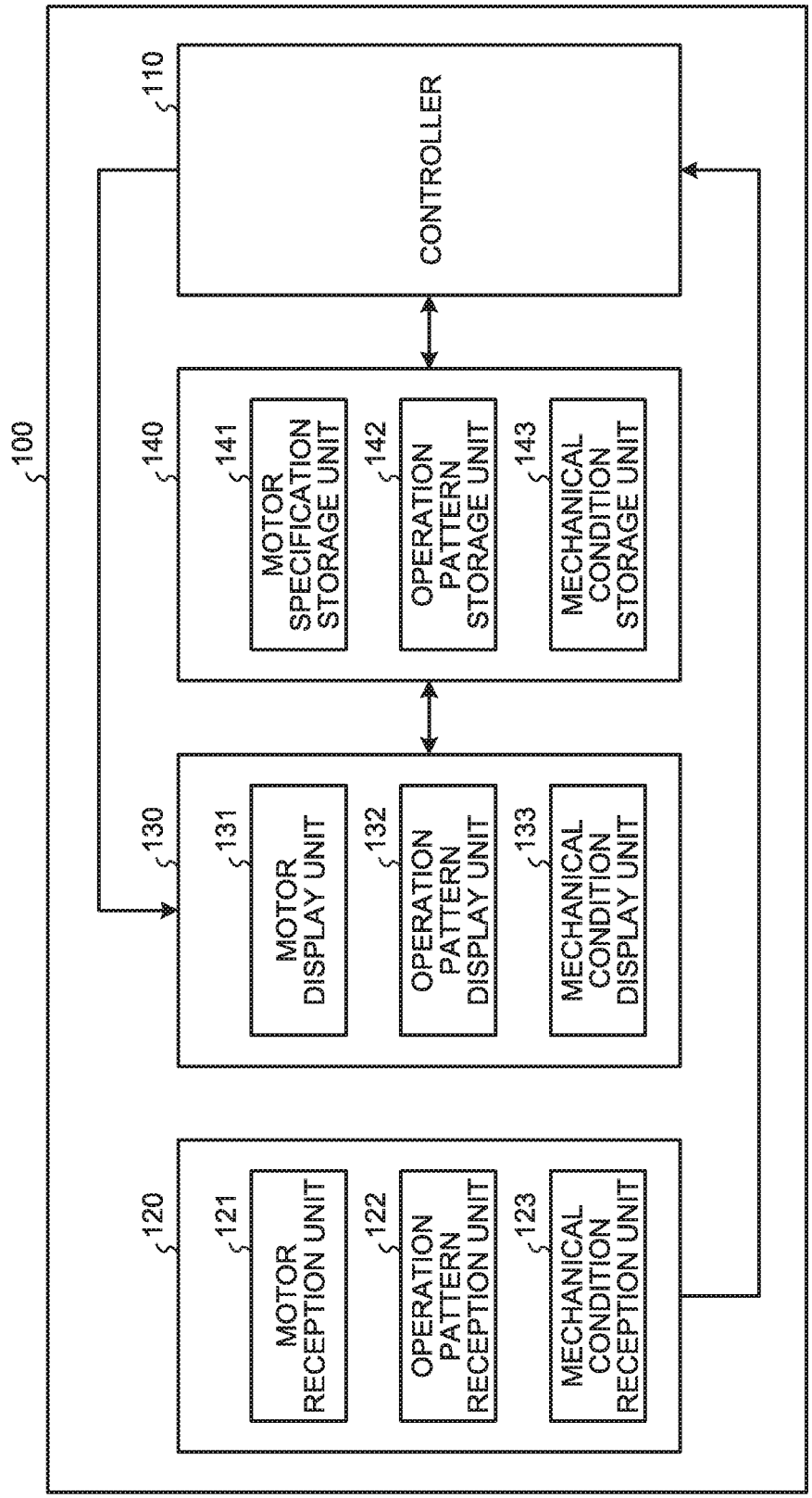
FIG. 1 is a block diagram illustrating a configuration of a parameter selection support system according to a first embodiment of the present invention.

FIG. 1 is a block diagram illustrating a configuration of the parameter selection support system 100 according to the first embodiment of the present invention. The parameter selection support system 100 includes a controller 110 that calculates a capacity, a reception unit 120 that receives inputs from a user, a display unit 130 that displays the information received by the reception unit 120, and a storage unit 140 that stores the information received by the reception unit 120.

The reception unit 120 includes a motor reception unit 121 that receives a motor type name of a servomotor which is a drive device that a user specifies, an operation pattern reception unit 122 that receives parameters of an operation pattern of a load that the user enters, and a mechanical condition reception unit 123 that receives parameters of mechanical condition of the load that the user enters. It is to be noted here that the operation pattern is for the load that is to be driven by the drive device, while the mechanical condition includes setting conditions relating to a mechanism of the load.

The display unit 130 includes a motor display unit 131 that displays a motor input screen where the user is allowed to input the user-specified motor, an operation pattern display unit 132 that displays an operation pattern input screen where the user is allowed to enter the parameters of the operation pattern for the load, and a mechanical condition display unit 133 that displays a mechanical condition input screen where the user is allowed to enter the parameters of the mechanical condition for the load. The motor display unit 131 displays not only the motor input screen where the user is allowed to input the user-specified motor, but also a screen showing the selected motor.

The storage unit 140 includes a motor specification storage unit 141 that retains specifications of each of motors, an operation pattern storage unit 142 that retains the operation pattern parameters of the load which the operation pattern reception unit 122 has received, and a mechanical condition storage unit 143 that retains the mechanical condition parameters of the load the mechanical condition reception unit 123 has received.

Figure 2:
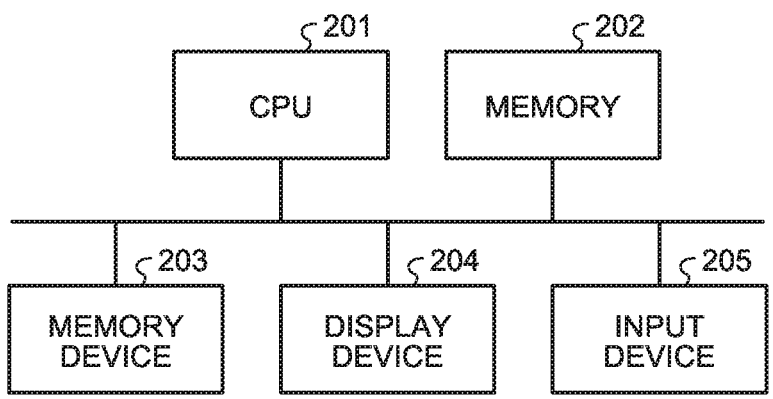
FIG. 2 illustrates a hardware configuration for implementation of functions of the parameter selection support system in a computer according to the first embodiment.

FIG. 2 illustrates a hardware configuration for implementation of functions of the parameter selection support system 100 in a computer according to the first embodiment. In cases where the functions of the parameter selection support system 100 are implemented in the computer, those functions of the parameter selection support system 100 are implemented by use of, as illustrated in FIG. 2, a central processing unit (CPU) 201, a memory 202, a memory device 203, a display device 204, and an input device 205.

Functions of the controller 110 are implemented by use of software, firmware, or a combination of software and firmware. The software or the firmware is described as a program and is stored in the memory device 203. The CPU 201 loads, into the memory 202, the parameter selection support program, which is stored in the form of the software, the firmware, or the combination of the software and the firmware in the memory device 203, and executes the parameter selection support program for implementation of the functions of the controller 110. In other words, in cases where the functions of the controller 110 are implemented in the computer, the parameter selection support system 100 includes the memory device 203 that stores the parameter selection support program according to which steps are eventually carried out for implementation of the functions of the controller 110. The parameter selection support program can be the one that causes the computer to carry out a parameter selection support method which is implemented by the functions of the controller 110. The reception unit 120 is implemented by use of the input device 205. Specific examples of the input device 205 include a keyboard, a mouse, and a touch panel. The display unit 130 is implemented by use of the display device 204. Specific examples of the display device 204 include a monitor and a display. The storage unit 140 is implemented by use of the memory 202. The memory 202 corresponds to a volatile storage area such as a random access memory (RAM). The memory device 203 corresponds to a nonvolatile or volatile semiconductor memory such as a read only memory (ROM), a flash memory, an erasable programmable read only memory (EPROM), or an electrically erasable programmable read only memory (EEPROM) (registered trademark), a magnetic disk, a flexible disk, an optical disk, a compact disk, a mini disk, or a digital versatile disk (DVD).

Figures 6, 7:
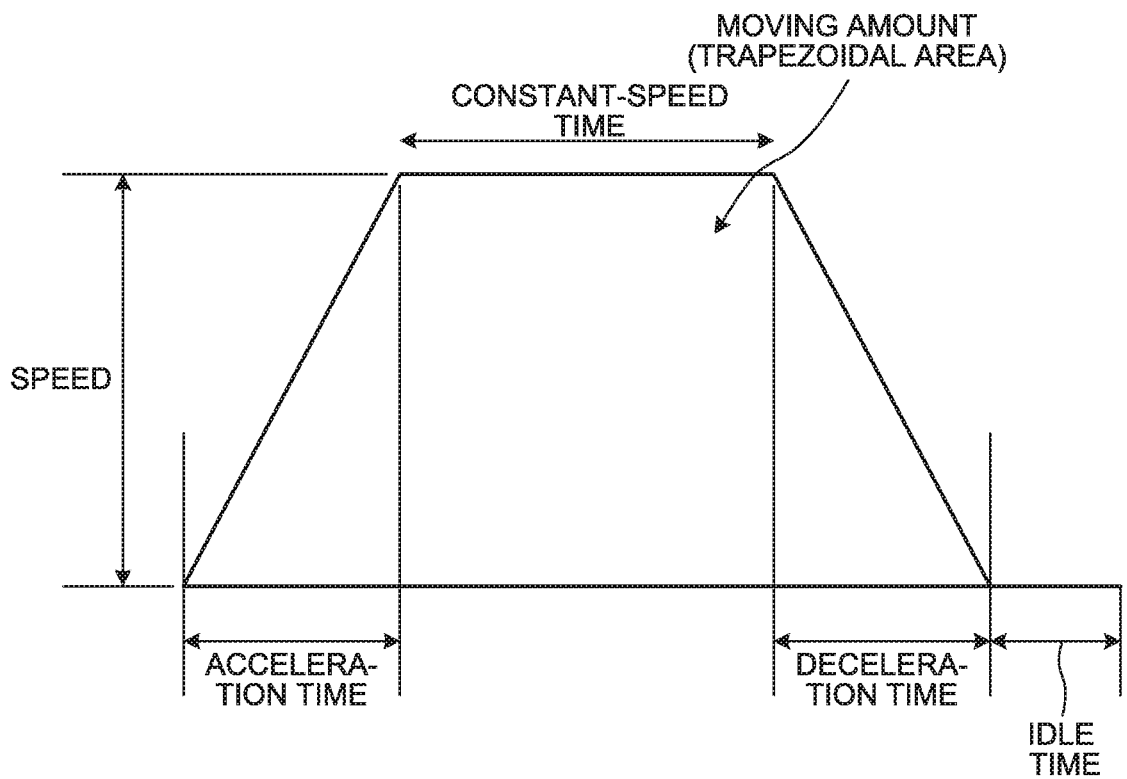
FIG. 6 illustrates an operation pattern input screen according to the first embodiment.
FIG. 7 illustrates an example of an operation pattern according to the first embodiment.

FIG. 3 is a flowchart showing operation of the parameter selection support system 100 according to the first embodiment. FIG. 4 illustrates a motor input screen according to the first embodiment. FIG. 5 illustrates a mechanical condition input screen according to the first embodiment. The input screen illustrated in FIG. 5 is an example where load mechanism setting is carried out. FIG. 6 illustrates an operation pattern input screen according to the first embodiment. A specific example of a load to which the load mechanism setting illustrated in FIG. 5 and an operation pattern illustrated in FIG. 6 refer is a ball screw. FIG. 7 illustrates an example of the operation pattern according to the first embodiment. FIG. 8 illustrates a screen showing a motor selection result according to the first embodiment. FIG. 9 illustrates a mechanical condition input screen where parameters are shown with allowable ranges according to the first embodiment. FIG. 10 illustrates an operation pattern input screen where parameters are shown with allowable ranges according to the first embodiment. FIG. 11 illustrates another mechanical condition input screen according to the first embodiment. FIG. 12 illustrates another mechanical condition input screen where the parameters are shown with allowable ranges according to the first embodiment. With reference to FIGS. 3 to 12, a description is hereinafter provided of the operation of the parameter selection support system 100.

First, when the user enters a motor type name of a user-specified servomotor in a field for "motor type name" on the motor input screen in FIG. 4 that is displayed by the motor display unit 131, the motor reception unit 121 receives that entered motor type name (step S1). Because the servomotor can be uniquely specified by the motor type name, one servomotor is identified in a list of servomotors included in a catalog. Once the servomotor is identified, a capacity of that servomotor is determined consequently. This means that the specification of the motor type name by the user leads to specification of the capacity by the user. This means that in step S1, the motor reception unit 121 receives the capacity of the specified motor. The specified capacity is indicated by "X". Using the motor type name received by the motor reception unit 121, the controller 110 refers to the motor specifications retained by the motor specification storage unit 141. Specific examples of the motor specifications include "maximum rotational speed", "maximum torque", "rated torque", and "rated output". The controller 110 controls the motor display unit 131 to display motor specification values corresponding to the received motor type name "motor-A" in corresponding fields for "maximum rotational speed", "maximum torque", "rated torque", and "rated output" on the motor input screen in FIG. 4. The value of the "rated output" corresponds to the above-mentioned capacity X, so that X=400 [W] in this case.

When the user enters desired values of parameters of mechanical condition in corresponding input fields on the mechanical condition input screen in FIG. 5 that is displayed by the mechanical condition display unit 133, the mechanical condition reception unit 123 receives these entered parameters of the mechanical condition (step S2). The mechanical condition storage unit 143 stores the mechanical condition parameters received by the mechanical condition reception unit 123. The controller 110 performs such control as to cause the mechanical condition display unit 133 to display the parameters received by the mechanical condition reception unit 123 as they are.

When the user enters desired values of parameters of the operation pattern in corresponding input fields on the operation pattern input screen in FIG. 6 that is displayed by the operation pattern display unit 132, the operation pattern reception unit 122 receives these entered parameters of the operation pattern (step S3). The operation pattern storage unit 142 stores the operation pattern parameters received by the operation pattern reception unit 122. These parameters are indicative of the operation pattern of the load that is driven by the servomotor which is a drive device, and are "moving amount", "speed", "acceleration time", "constant-speed time", "deceleration time", and "idle time" of the load. Their relationship is illustrated in FIG. 7. The controller 110 may perform such control as to cause the operation pattern display unit 132 to display the parameters including the "moving amount", the "speed", the "acceleration time", the "constant-speed time", the "deceleration time", and the "idle time" as they are when they are received by the operation pattern reception unit 122. In that case, the controller 110 generates a graph as illustrated in FIG. 7 based on the "moving amount", the "speed", the "acceleration time", the "constant-speed time", the "deceleration time", and the "idle time" that have been received by the operation pattern reception unit 122, and causes the operation pattern display unit 132 to display the graph together with FIG. 6.

The controller 110 may retain such a mathematical relation between the "moving amount" corresponding to a trapezoidal area in FIG. 7 and some elements illustrated in FIG. 7. The elements include the "speed", the "acceleration time", the "constant-speed time" and the "deceleration time" that are illustrated in FIG. 7. In other words, the controller 110 may retain information on a formula that expresses this relation. In this case, even when the operation pattern reception unit 122 has not received some of the parameters including the "moving amount", the "speed", the "acceleration time", the "constant-speed time", and the "deceleration time", the controller 110 can calculate the unreceived parameter based on the received parameters and the above relation. Specifically, even when the "speed" has not been entered by the user, the controller 110 can calculate the "speed" if the "moving amount", the "acceleration time", the "constant-speed time", and the "deceleration time" have been entered, and thus can cause the operation pattern display unit 132 to display a value of the "speed". Even when the "moving amount" has not been entered by the user, the controller 110 can calculate the "moving amount" if the "speed", the "acceleration time", the "constant-speed time", and the "deceleration time" have been entered, and thus can cause the operation pattern display unit 132 to display a value of the "moving amount". By calculating the unreceived parameter in this way, the controller 110 can generate such a graph in FIG. 7 and can cause the operation pattern display unit 132 to display the graph together with FIG. 6.

Next, the controller 110 calculates a required servomotor capacity Y based on the mechanical condition parameters retained by the mechanical condition storage unit 143 and the operation pattern parameters retained by the operation pattern storage unit 142 (step S4). The controller 110 holds beforehand a relation between servomotor capacity, and the mechanical condition parameters and the operation pattern parameters, and thus can calculate the required capacity Y based on that relation.

Specifically, the capacity Y is a servomotor output wattage determined based on the mechanical condition parameters and the operation pattern parameters. The output wattage is obtained by Formula (1) below:

Output wattage=(2π)*{("motor speed"/2)*"torque during acceleration"*"acceleration time"+"motor speed"*"torque at constant speed"*"constant-speed time"+("motor speed"/2)*"torque during deceleration"*"deceleration time"}/("acceleration time"+"constant-speed time"+"deceleration time"+"idle time")    (1)

In Formula (1), "motor speed"="speed"/"distance traveled in one rotation of motor". The "distance traveled in one rotation of motor" is also referred to as "ball screw lead". The "torque during acceleration", the "torque at constant speed", and the "torque during deceleration" are calculated based on the mechanical condition parameters by use of publicly known means.

The controller 110 subsequently determines whether or not the servomotor capacity Y calculated in step S4 is less than or equal to the servomotor capacity X specified in step S1 (step S5).

In cases where the calculated capacity Y is determined as being less than or equal to the specified servomotor capacity X in step S5 (step S5: Yes), the controller 110 causes the motor display unit 131 to display the motor selection result illustrated in FIG. 8 (step S6). In this case, the servomotor capacity Y calculated in step S4 can be achieved by the servomotor entered in step S1. That means that the mechanical condition parameters received in step S2 and the operation pattern parameters received in step S3 are allowable for the servomotor capacity X entered in step S1. Therefore, the motor selection result illustrated in FIG. 8 shows a "rotational speed", a "torque during acceleration", a "torque during deceleration", a "continuously effective load torque", and an "output wattage" based on the allowable parameters. The values shown in fields for "rotational speed", "torque during acceleration", "torque during deceleration", "continuously effective load torque", and "output wattage" have been calculated by the controller 110 based on the mechanical condition parameters retained by the mechanical condition storage unit 143 and the operation pattern parameters retained by the operation pattern storage unit 142. The "rotational speed" is a rotational speed of the servomotor during the constant-speed time in FIG. 7. The "torque during acceleration" is a torque required during the acceleration time in FIG. 7. The "torque during deceleration" is a torque required during the deceleration time in FIG. 7. The "continuously effective load torque" is a time-averaged torque for the operation pattern illustrated in FIG. 7. The "output wattage" is a time-averaged power consumption for the operation pattern illustrated in FIG. 7, and it is the capacity Y that corresponds to this value. Thus, Y=250 [W], so that Y≤X(=400 [W]) is satisfied.

In cases where the calculated capacity Y is determined as being greater than the specified servomotor capacity X in step S5 (step S5: No), the controller 110 causes the operation pattern display unit 132 and the mechanical condition display unit 133 to encourage, by display, adjustment of the operation pattern and adjustment of the mechanical condition (step S7). In this case, the servomotor capacity Y calculated in step S4 cannot be achieved by the user-specified servomotor received in step S1, so that the specified servomotor is unsuitable. That means that the mechanical condition parameters received in step S2 and the operation pattern parameters received in step S3 are unallowable for the specified servomotor capacity X. Accordingly, for those operation pattern and mechanical condition parameters that cause the specified servomotor to be unsuitable, the controller 110 calculates allowable parameter ranges for the capacity X of the specified servomotor and effects display of those allowable ranges on the operation pattern input screen and the mechanical condition input screen, in step S7. As described above, the controller 110 holds beforehand the relation between the servomotor capacity, and the mechanical condition parameters and the operation pattern parameters, and thus can calculate, based on that relation, the allowable range of each of those parameters for the specified capacity X. In this way, the user can be encouraged to make parameter adjustment for re-input.

Specifically, the controller 110 causes the mechanical condition display unit 133 to display the mechanical condition input screen illustrated in FIG. 9 where some of the parameters of the mechanical condition are shown with the corresponding allowable ranges. The controller 110 also causes the operation pattern display unit 132 to display the operation pattern input screen illustrated in FIG. 10 where the parameters of the operation pattern are shown with the corresponding allowable ranges. In cases where a parameter or parameters that cause the specified servomotor to be unsuitable belong to either the operation pattern or the mechanical condition, an allowable parameter range or allowable parameter ranges are calculated by the controller 110 and displayed by the display unit 130. For allowable-range specification, one of threshold values may be shown as illustrated in FIG. 9, or both the threshold values, namely, an upper limit and a lower limit may be shown as illustrated in FIG. 10. Because the allowable ranges of the parameters are shown with the thresholds, the number of re-inputs by the user and the number of required-capacity calculations can be reduced.

Each of the above allowable parameter ranges is set such that, if the parameter is set to fall outside the allowable range, it leads the specified servomotor to be unsuitable. In other words, the allowable parameter range is a numerical range excluding parameter value ranges that cause the specified servomotor to be unsuitable. Accordingly, in cases where an allowable range is set for each of a plurality of parameters, freely resetting those parameters so that their values fall within their corresponding allowable ranges does not necessarily cause the specified servomotor suitable. However, each of the allowable parameter ranges is the value range serving as an index that helps the user efficiently reselect the parameter to make the specified servomotor fit.

A concrete description is provided here of a method for calculating an allowable parameter range taking an upper limit of the above-mentioned "speed" as an example. With variables other than the "motor speed" specified as fixed values and with the "motor speed" being a variable in Formula (1) described above, the output wattage is determined. Subsequently, an upper limit of the "motor speed" is obtained from an inequality relation where the determined output wattage is less than or equal to the capacity X, which is the "rated output" of the specified servomotor. Once the upper limit is obtained for the "motor speed", the upper limit of the "speed" can be obtained instantly. The allowable range specified for the "motor speed" can be further limited from a condition where the motor specifications other than the "rated output", namely, the "maximum rotational speed", the "maximum torque", and the "rated torque" are satisfied.

The mechanical condition input screen displayed in step S2 by the mechanical condition display unit 133 may include, as illustrated in FIG. 11, check boxes that allow specified parameters to have fixed values. In cases where the user has fixed the value of "ball screw diameter" by check-marking as illustrated in FIG. 11, and the mechanical condition reception unit 123 receives the value "20" together with the check mark in step S2, the controller 110 calculates, in later step S7, allowable ranges for any parameters that have not been specified to have fixed values. Subsequently, the controller 110 causes the mechanical condition display unit 133 to display a mechanical condition input screen as illustrated in FIG. 12. In FIG. 12, with the "ball screw diameter" being fixed at "20" (mm), the allowable range for the parameter "table mass" that has not been specified to have a fixed value shows that the "table mass" should be less than or equal to 150 kg.

The process returns to step S2 after step S7. With reference to the allowable range displayed by the mechanical condition display unit 133, the user changes, for re-input, the mechanical condition input screen's parameter value in FIG. 9 that causes the unsuitability. The mechanical condition reception unit 123 receives the parameter that has undergone the change. In cases where all the parameters that cause the unsuitability do not belong to the mechanical condition but to the operation pattern, step S7 is followed by step S3 with step S2 skipped. In step S3, the user can similarly work on the operation pattern parameter or the operation pattern parameters that cause the unsuitability on the input screen in FIG. 10. In cases where all the parameters that cause the unsuitability do not belong to the operation pattern but to the mechanical condition, step S2 is followed by step S4 with step S3 skipped.

In cases where an upper limit and a lower limit like those in FIG. 10 are shown, it is possible that a recommended value falling within an allowable range having the upper and lower limits, such as an average of the upper and lower limits, is calculated by the controller 110, displayed in an input field for the parameter in FIG. 10 by the operation pattern display unit 132 and received by the operation pattern reception unit 122. This enables the user to save time and labor to re-input.

In the above-described parameter selection support system 100 according to the first embodiment, the allowable parameter range is displayed, on the parameter input screen, as the index to cause the specified servomotor suitable, so that the user only needs to carry out re-input for the parameter falling outside the allowable range, thus saving time and labor in input operation. Therefore, a user who has no special knowledge can easily set allowable parameter values for the capacity of the specified servomotor.

Second Embodiment

The parameter selection support system 100 according to the second embodiment of the present invention is similar to that of FIG. 1. An operation flow of the parameter selection support system 100 according to the second embodiment is similar to that of FIG. 3. When causing, in step S7, display of allowable ranges on an operation pattern input screen and a mechanical condition input screen for those operation pattern and mechanical condition parameters that cause a specified servomotor to be unsuitable, the controller 110 of the parameter selection support system 100 according to the second embodiment causes the display unit 130 to highlight a parameter that is influential in causing the specified servomotor to be unsuitable. In other words, when parameter values are unallowable for a capacity of the specified servomotor and when parameter values are unallowable for a capacity of the specified servomotor and include some parameter values that are influential in causing the specified servomotor to be unsuitable, the controller 110 causes the display unit 130 to highlight those influential values.

FIG. 13 illustrates an operation pattern input screen where parameters are shown with allowable ranges according to the second embodiment. FIG. 14 illustrates how an operation pattern is corrected according to the second embodiment. In the FIG. 13 illustration, "acceleration time" of the operation pattern is the parameter that is most influential in causing the specified servomotor to be unsuitable, and "0.15" (s) entered as an "acceleration time" by a user in step S3 is highlighted in step S7 by the operation pattern display unit 132. Highlighting may be done by any method such as use of a color that is different from a color for other parameters or flashing. It is to be noted that the plurality of parameters may be highlighted. In addition to the above operation pattern parameter or in place of the above operation pattern parameter, any one of the mechanical condition parameters can be highlighted while being shown with its allowable range.

In FIG. 13, the "acceleration time" is shown with "0.3"≤"0.15"≤"0.5" which means that this user-entered "0.15" does not fall within this allowable range. When the "acceleration time" is "0.15" (s), a large torque is required during acceleration as illustrated in FIG. 14 and the torque exceeds a "maximum torque" of the servomotor specified in FIG. 4. Accordingly, "0.3" or more needs to be set as an "acceleration time" to adjust the operation pattern as indicated by an arrow in FIG. 14. If this user-entered value "0.15" as the "acceleration time" is highlighted as illustrated in FIG. 13, it is possible to return to step S3 to encourage an input of an "acceleration time" again.

In the above-described parameter selection support system 100 according to the second embodiment, the parameter that is influential in causing the specified servomotor to be unsuitable is highlighted and thus can be presented to the user as a priority that should be corrected in order to cause the specified servomotor to be suitable. Consequently, the user can easily reset that parameter.

Third Embodiment

Figures 16, 17:
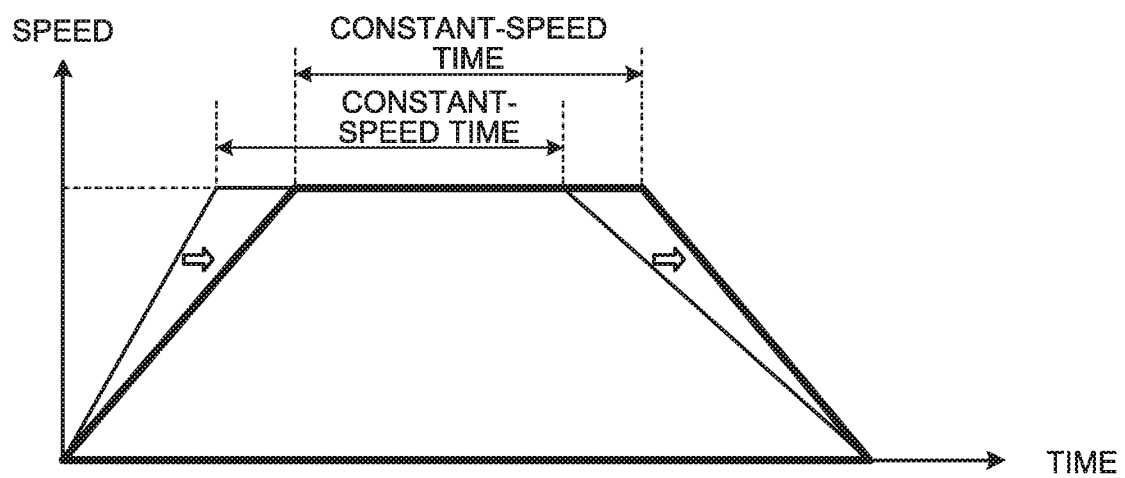
FIG. 16 illustrates an operation pattern input screen where parameters are shown with respective allowable ranges according to the third embodiment.
FIG. 17 illustrates how an operation pattern is corrected according to the third embodiment.
Figures 18, 19:
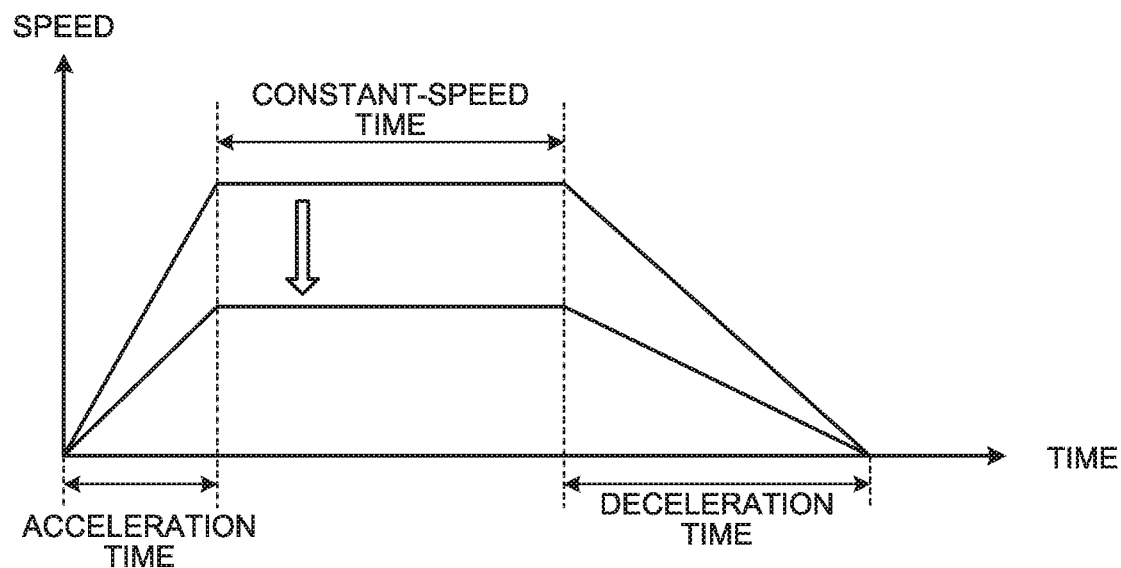
FIG. 18 is another illustration of how the operation pattern is corrected according to the third embodiment.
FIG. 19 illustrates an operation pattern input screen according to a fourth embodiment of the present invention.

The parameter selection support system 100 according to the third embodiment of the present invention is similar to that of FIG. 1. An operation flow of the parameter selection support system 100 according to the third embodiment is similar to that of FIG. 3. FIG. 15 illustrates an operation pattern input screen according to the third embodiment of the present invention. FIG. 16 illustrates an operation pattern input screen where parameters are shown with allowable ranges according to the third embodiment. FIG. 17 illustrates how an operation pattern is corrected according to the third embodiment. FIG. 18 is another illustration of how the operation pattern is corrected according to the third embodiment.

The operation pattern display unit 132 of the parameter selection support system 100 according to the third embodiment displays, as illustrated in FIG. 15, the operation pattern input screen provided with check boxes each of which allows, in step S3, corresponding one of parameters to be specified to have a fixed value. A user can fix parameter values the user wants to maintain by marking the check boxes even if a specified servomotor becomes unsuitable. In cases where the operation pattern reception unit 122 has received values of parameters including "moving amount" and "idle time" together with their check marks in step S3, the controller 110 calculates, in later step S7, an allowable range for each of any parameters that has not been specified to have a fixed value. Subsequently, the controller 110 causes the operation pattern display unit 132 to display an operation pattern input screen such as the one illustrated in FIG. 16. In FIG. 16, the "moving amount" and the "idle time" are correspondingly fixed at their values that have been received in step S3 by the operation pattern reception unit 122, the parameters of "speed", "acceleration time", "constant-speed time", and "deceleration time" that have not been specified to have fixed values are correspondingly shown with the allowable ranges.

A description is hereinafter provided of meaning of fixing an operation pattern parameter. Consideration is given to cases where a large torque exceeding a "maximum torque" of the specified servomotor is required during acceleration because a short "acceleration time" is entered by the user in step S3.

In cases where the user has entered, in step S3, values along with those check marks to fix the values of the "moving amount", the "speed", and the "constant-speed time", allowable ranges are displayed in later step S7 to encourage correction of the "acceleration time" and the "deceleration time" for reducing a torque required during acceleration while the "moving amount" that corresponds to a trapezoidal area translating into the operation pattern, the "speed", and the "constant-speed time" are maintained as illustrated in FIG. 17.

In cases where the user has entered, in step S3, values along with those check marks to fix the values of the "acceleration time", the "constant-speed time", and the "deceleration time", allowable ranges are displayed in later step S7 to encourage correction of the "moving amount", which corresponds to the trapezoidal area, and the "speed" for reducing a torque required during acceleration while the "acceleration time", the "constant-speed time", and the "deceleration time" are maintained as illustrated in FIG. 18.

The parameter selection support system 100 according to the third embodiment enables the user to limit parameter types that should be reset. Moreover, easy resetting of the operation pattern parameter(s) is enabled for the user to achieve a required acceleration torque that is less than or equal to the "maximum torque" of the specified servomotor.

Fourth Embodiment

The parameter selection support system 100 according to the fourth embodiment of the present invention is similar to that of FIG. 1. An operation flow of the parameter selection support system 100 according to the fourth embodiment is similar to that of FIG. 3. While user-specified parameters are fixed in the third embodiment, a user can set a more flexible constraint condition for each of parameters.

FIG. 19 illustrates an operation pattern input screen according to the fourth embodiment of the present invention. FIG. 20 illustrates an operation pattern input screen where parameters are shown with allowable ranges according to the fourth embodiment. FIG. 21 illustrates a relationship between fixation degree and each of the allowable ranges according to the fourth embodiment.

The operation pattern display unit 132 of the parameter selection support system 100 according to the fourth embodiment displays, as illustrated in FIG. 19, the operation pattern input screen where fields are provided to allow entry of fixation degrees for the parameters of an operation pattern in step S3. The fixation degree is a value representing a strength of fixation or constraint when the parameter is selected. A fixation degree of 100% means that the parameter is fixed as in the case of the third embodiment. A fixation degree of 0% means that an allowable range calculated by the controller 110 for the parameter is displayed as it is. This means that the larger the fixation degree, the narrower the initial allowable parameter range becomes based on the fixation degree. In cases where there are parameters that admit of not much flexibility in setting because of a kind of load that is driven by a drive device, the user can limit flexibility of parameter selection by specifying the fixation degrees.

In cases where the operation pattern reception unit 122 has received, in step S3, user-entered values together with user-entered fixation degrees for "moving amount," "speed", "acceleration time", "constant-speed time", "deceleration time", and "idle time", the controller 110 causes, in later step S7, the operation pattern display unit 132 to display an operation pattern input screen such as the one illustrated in FIG. 20. The allowable ranges displayed in FIG. 20 for the "moving amount", the "speed", the "acceleration time", the "constant-speed time", the "deceleration time", and the "idle time" have undergone limitation based on the respective fixation degrees, correspondingly.

With reference to FIG. 21, a description is provided of limitations of the allowable parameter range illustrated in FIG. 20 based on the fixation degrees, correspondingly.

On the basis of a relation between servomotor capacity, and mechanical condition parameters and the operation pattern parameters, the controller 110 calculates an allowable range for the "moving amount" for a specified capacity X. If the allowable range for the "moving amount" has, as a result of the calculation, a lower limit of 150 mm and an upper limit of 200 mm, in a "moving amount " row of FIG. 21, a value corresponding to the fixation degree of 0% is 150 mm, while a value corresponding to the fixation degree of 100% is 200 mm. A "moving amount" value corresponding to a fixation degree falling within a range of 10% to 90%, is obtained by addition of the lower limit and an increment that corresponds to the fixation degree when a difference between the upper limit and the lower limit is 100%. When the fixation degree of 80% is entered for the "moving amount" as illustrated in FIG. 19, the operation pattern display unit 132 displays, as a final allowable range for the "moving amount" in FIG. 20, a range from the "moving amount" value corresponding to the fixation degree of 80% to the "moving amount" value corresponding to the fixation degree of 100% of FIG. 21, namely, a range from 190 mm to 200 mm, is shown. As such, those italic values in the "moving amount" row of FIG. 21 are allowable.

On the basis of the relation between the servomotor capacity, and the mechanical condition parameters and the operation pattern parameters , the controller 110 calculates an allowable range for the "speed" that is allowable for the specified capacity X. If the allowable range for the "speed" has, as a result of the calculation, a lower limit of 100 mm/s and an upper limit of 200 mm/s, in a "speed" row of FIG. 21, a value corresponding to the fixation degree of 0% is 100 mm/s, while a value corresponding to the fixation degree of 100% is 200 mm/s. "speed" values corresponding to a fixation degree falling within the range of 10% to 90%, are each obtained by addition of the lower limit and an increment that corresponds to each fixation degree when a difference between the upper limit and the lower limit is 100%. When the fixation degree of 0% is entered for the "speed" as illustrated in FIG. 19, the operation pattern display unit 132 displays, as a final allowable range for the "speed" in FIG. 20, a range from the "speed" value corresponding to the fixation degree of 0% to the "speed" value corresponding to the fixation degree of 100% of FIG. 21, namely, a range from 100 mm/s to 200 mm/s, is shown. As such, those italic values in the "speed" row of FIG. 21 are allowable.

On the basis of the relation between the servomotor capacity, and the mechanical condition parameters and the operation pattern parameters, the controller 110 calculates an allowable range for the "acceleration time" that is allowable for the specified capacity X. If the allowable range for the "acceleration time" has a lower limit of 0.15 s and an upper limit of 0.3 s as a result of the calculation, a value corresponding to the fixation degree of 0% is 0.3 s while a value corresponding to the fixation degree of 100% is 0.15 s in an "acceleration time" row of FIG. 21. "acceleration time" values corresponding to a fixation degree falling within the range of 10% to 90%, are each obtained by addition of the upper limit and a decrement that corresponds to each fixation degree when a difference between the upper limit and the lower limit is 100%. When the fixation degree of 20% is entered for the "acceleration time" as illustrated in FIG. 19, the operation pattern display unit 132 displays, as a final allowable range for the "acceleration time" in FIG.

20, a range from the "acceleration time" value corresponding to the fixation degree of 100% to the "acceleration time" value corresponding to the fixation degree of 20% of FIG. 21, namely, a range from 0.15 s to 0.27 s, is shown. As such, those italic values in the "acceleration time" row of FIG. 21 are allowable.

For the "constant-speed time" and the "deceleration time", allowable ranges are determined in a manner similar to the above and are displayed as in FIG. 20 by the operation pattern display unit 132.

The parameter selection support system 100 according to the fourth embodiment can narrow down the allowable parameter range based on the user-specified fixation degree, thus enabling the user to limit the allowable parameter range based on the kind of load.

The above configurations illustrated in the embodiments are examples of contents of the present invention, can be combined with other techniques that are publicly known and can be partly omitted or changed without departing from the gist of the present invention.

REFERENCE SIGNS LIST 100 parameter selection support system; 110 controller; 120 reception unit; 121 motor reception unit; 122 operation pattern reception unit; 123 mechanical condition reception unit; 130 display unit; 131 motor display unit; 132 operation pattern display unit; 133 mechanical condition display unit; 140 storage unit; 141 motor specification storage unit; 142 operation pattern storage unit; 143 mechanical condition storage unit; 201 CPU 202 memory; 203 memory device; 204 display device; 205 input device.

The invention claimed is:

1. A parameter selection support system that supports, based on a capacity X expressed as an output wattage of a motor that is specified by a type name, selection of parameters of at least one of an operation pattern and a mechanical condition for a load that is driven by the motor, the parameters of the mechanical condition including at least a ball screw lead, the parameter selection support system comprising:
 a display to display an input screen for the parameters;
 input circuitry to receive the parameters and the capacity X;
 a processor to execute a program; and
 a memory to store the program which, when executed by the processor, performs steps of:
 causing the display to encourage, by display, parameter adjustment when a capacity Y that is calculated based on the parameters received by the input circuitry and is expressed as an output wattage is greater than the capacity X, calculating an allowable range for each of some of the parameters that is allowable for the capacity X received by the input circuitry and causing the display to display the allowable range on the input screen of the display.

2. The parameter selection support system according to claim 1, wherein the processor calculates the allowable range for each of one or more of the parameters that is not specified to have a fixed value when the capacity Y is greater than the capacity X.

3. The parameter selection support system according to claim 1, wherein the allowable range is specified by an upper limit and a lower limit.

4. The parameter selection support system according to claim 3, wherein the processor calculates a recommended value that falls within the allowable range and causes the display to display the recommended value.

5. The parameter selection support system according to claim 1, wherein when displayed by the display, the allowable range is limited based on a fixation degree received by the input circuitry.

6. The parameter selection support system according to claim 1, wherein the processor causes the display to display a motor selection result when the capacity Y is less than or equal to the capacity X.

7. The parameter selection support system according to claim 1, wherein the processor calculates an upper limit and a lower limit for one of the parameters first so that the capacity Y, which is obtained with the one parameter being a variable and with variables other than the one parameter specified as fixed values, becomes less than or equal to the capacity X, and
 sequentially calculates, based on the upper limit and the lower limit of the one parameter, upper limits and lower limits as allowable ranges for rest of the parameters to calculate each allowable range for each of the parameters.

8. A parameter selection support method of supporting, based on a capacity X expressed as an output wattage of a motor that is specified by a type name, selection of parameters of at least one of an operation pattern and a mechanical condition for a load that is driven by the motor, the parameters of the mechanical condition including at least a ball screw lead, the parameter selection support method being carried out by a parameter selection support system and comprising:
 displaying an input screen for the parameters;
 receiving the parameters and the capacity X;
 encouraging, by the displaying, parameter adjustment when a capacity Y that is calculated based on the parameters and is expressed as an output wattage is greater than the capacity X,
 calculating an allowable range for each of some of the parameters that is allowable for the capacity X based on a relation between the parameters and the capacity X; and
 displaying the allowable range for each of some of the parameters on the input screen.

* * * * *